Patented Feb. 22, 1949

2,462,430

UNITED STATES PATENT OFFICE 2,462,430

SULFUR-CONTAINING POLYAMIDES

Allan K. Schneider, Wilmington, Del., assignor to E. I. du Pont de Nemours & Company, Wilmington, Del., a corporation of Delaware No Drawing. Application December 30, 1943, Serial No. 516,283

6 Claims. (Cl. 260—72)

This invention relates to the polymeric materials, and more particularly to the preparation of sulfur-containing polyamides.

Synthetic linear polyamides of the general type described in United States Patents 2,071,250, 2,071,253, and 2,130,948 constitute an important class of polymeric materials, since they can be converted into valuable fibers, films and coatings. For certain purposes, however, it would be desirable to modify these polyamides to improve their initial solubility and/or to convert them into a form that can be rendered insoluble and infusible. One method for accomplishing this purpose which has been proposed consists in reacting a polyamide in organic acid solution with formaldehyde to obtain N-methylol polyamides. Another method consists in reacting a polyamide in the presence of acid with formaldehyde and a formaldehyde-reactive compound, such as an alcohol or mercaptan, to produce N-alkoxymethyl or N-alkyl-thiomethyl polyamides, depending on the formaldehyde-reactive compound employed.

An object of this invention is to provide a new method for preparing sulfur-containing polyamides. A further object is to provide a new and improved method for preparing N-alkylthiomethyl polyamides and related products. A still further object is to prepare new polymeric materials. Other objects will appear hereinafter.

These objects are accomplished by reacting a polymer of the class consisting of N-methylol polyamides and N-alkoxymethyl polyamides with a thiol in the presence of an acid catalyst.

The N-methylol polyamides are obtained by reacting at temperatures of from 30° to 80° C. formaldehyde with a solution in an oxygen-containing acid of a polyamide of the kind described in the above mentioned patents which contain hydrogen-bearing amide groups, and prior to gelation isolating the resulting N-methylol compound by precipitation with a non-solvent. N-methylol polyhexamethylene adipamide, for example, can be prepared by the following procedure: Eight parts of commercial formaldehyde solution (containing 37% formaldehyde by weight) is added to a solution heated to 60° C. of 3 parts polyhexamethylene adipamide in 18 parts of formic acid (sp. gr. 1.20). The mixture is stirred for 10 minutes during which time the solution remains clear and fluid. At the end of this period the reaction mixture is poured into 80 parts acetone containing sufficient ammonium hydroxide to neutralize the formic acid and stop the reaction. The soft, fluffy precipitate of N-methylol polyamide is collected and air-dried.

The N-alkoxymethyl polyamides are obtained by reacting a polyamide, which is of the kind described in the above mentioned patents and which contains hydrogen-bearing amide groups, with formaldehyde and an alcohol in the presence of an oxygen-containing acid catalyst such as, for example, formic, trimethylacetic, and the acids of phosphorus. The reaction can be effected with a solution of the polyamide, formaldehyde, and an alcohol in formic acid at temperatures of from 0° C. to the temperature at which degradation of the polyamide chain takes place, and preferably at temperatures of from 25° C. to 75° C. The reaction can also be conducted by heating the pulverized polyamide with an alcohol and formaldehyde in the presence of a small amount of phosphoric acid at 90°–200° C. The reaction is preferably continued until at least 10% and up to 60% or more of the amide groups in the original polyamide are converted to N-alkoxymethyl groups. The preparation of N-methoxymethyl polyhexamethylene adipamide is illustrated by the following procedure:

A solution of 1 part polyhexamethylene adipamide (intrinsic viscosity=1.0) in 3.7 parts of formic acid (commercial grade, specific gravity= 1.20) was prepared at 60° C. in a stainless steel reaction vessel equipped with a mechanical stirrer and an opening for the addition of reagents. To this was added at 60° C. a solution of 1 part paraformaldehyde dissolved in 1.33 parts methanol containing 0.0006 part sodium hydroxide to depolymerize the paraformaldehyde and render it soluble in the methanol. The resulting solution was maintained at 60° C. for 30 minutes during which time an additional 0.3 part of methanol was added. This solution was poured into a mixture of 9 parts acetone and 11.5 parts of cold water with stirring. The resulting solution was then made basic to litmus by the addition of concentrated aqueous ammonia, the mixture being maintained below 40° C. and stirred vigorously during this step. The reaction product, N-methoxymethyl polyhexamethylene adipamide, separated from the mixture as a white granular solid. This product was removed by filtration, washed thoroughly and dried in vacuum at 50° C.

These N-methylol and N-alkoxymethyl polyamides, which are used as starting materials in the process of this invention are characterized in that a plurality of the amide groups in the polymer chain contain substituents of formula —CH$_2$OR in which R is hydrogen or a monovalent organic radical, generally a hydrocarbon radical. By the process of the present invention one or more of the —CH$_2$OR groups are converted into —CH$_2$SR' groups, wherein R' represents the monovalent organic radical resulting from the removal of a hydrogen attached to sulfur from a thiol of formula R'SH. The preferred N-methylol polyamides and N-alkoxymethyl polyamides used in the process of this invention are high molecular weight fiber-forming polymers prepared from synthetic linear polycarbonamides of the type described in the foregoing patents. In these polycarbonamides the average number of carbon atoms in the segments of the chain separating the amide groups is at least two. In general the N-alkoxymethyl polyamides will contain some N-methylol amide groups.

The process of this invention is illustrated in the following examples in which parts are given by weight.

*Example I*

The polyamide used in this example was N-methoxymethyl polyhexamethylene adipamide prepared by treating a fiber-forming polyhexamethylene adipamide with formaldehyde and methyl alcohol in the presence of phosphoric acid. Analysis showed that the product contained 9.72% by weight of methoxy groups and 0.63% by weight of methylol groups, indicating that 46% of the amide groups in the original polymer were substituted in the reaction.

A solution of the above mentioned N-methoxymethyl polyamide was prepared by stirring, at 60° C., 20 parts of the polymer with 64 parts methanol and 20 parts water. The resulting solution was cooled to room temperature and to it was added a solution of 11.5 parts 1-thiosorbitol in 10 parts water and 24 parts methanol. The mixture was stirred until homogeneous and then 5 parts concentrated hydrochloric acid dissolved in methanol was added. The mixture was heated at 60° C. for 45 minutes and then allowed to stand at room temperature for 15 hours. The sulfur-containing polymer thus obtained was precipitated by pouring the solution into water. The white gummy precipitate was washed with dilute ammonia and then with water. The product, after drying in air, was found to contain 5.05% sulfur, which indicated that 27% of the amide groups in the polymer contained a sulfur bearing substituent, i. e. 27% of the amide groups carried a substituent of formula

—CH$_2$SCH$_2$(CHOH)$_4$CH$_2$OH

The product was much more sensitive to water than the original N-methoxymethyl polyhexamethylene adipamide. It could be formed from melt or solution into films and fibers which could be cold drawn.

*Example II*

A solution of N-methoxymethyl polyhexamethylene adipamide (containing 11.5% by weight of methoxyl groups and 0.45% by weight of methylol groups corresponding to 54% total amide substitution) was prepared by stirring 20 parts of polymer with 80 parts of absolute ethanol at 65° C. To this solution was added 25 g. of octadecyl mercaptan and 1.1 g. concentrated hydrochloric acid. After mixing, the solution was allowed to stand at room temperature for 20 minutes. The N-octadecylthiomethyl polyhexamethylene adipamide thus formed was precipitated from solution by the addition of acetone. The precipitate, a white granular product, was dried in air. Analysis showed that the product contained 3.26% by weight of sulfur and 3.14% by weight of methoxyl groups. This showed that only a part of the N-methoxymethyl amide groups had been converted into N-octadecylthiomethyl groups. Roughly speaking 17% of the amide groups in the product contained an octadecylthiomethyl substituent. The product was more soluble in acetone, chloroform, and benzene than the original N-methoxymethyl polyamide. A product obtained in the same manner but containing 4.4% sulfur on application to cotton broadcloth imparted water repellent properties to the fabric. The treated fabric retained its water repellent properties even after laundering.

*Example III*

Five parts of a polyhexamethylene adipamide containing 1.7% by weight of methoxyl groups and 5.9% by weight of methylol groups was dissolved under reflux in 45 parts of 80% aqueous ethanol, i. e. a mixture containing 80 parts ethanol and 20 parts water. To this solution was added 5 parts of ethyl mercaptan and 1.19 parts of concentrated aqueous hydrochloric acid. After 4 hours heating on a steam bath, the solution was allowed to stand for 16 hours at room temperature. The polymer was precipitated by pouring the solution into dilute aqueous ammonia. The resulting product was readily soluble in hot aqueous alcohols. It contained 3.96% by weight of sulfur which showed that about 17% of the amide groups in the product were substituted with ethylthiomethyl groups.

This invention is not limited to the use of the specific reactants mentioned in the foregoing examples. Thus, in place of N-methoxymethyl polyhexamethylene adipamide, other N-alkoxymethyl polyamides can be used, e. g., N-ethoxymethyl polyhexamethylene adipamide, N-methoxymethyl polyhexamethylene sebacamide, and N-isobutoxymethyl polydecamethylene adipamide. N-alkoxymethyl polyamides derived from amino acid polymers or from polysulfonamides, interpolyamides, and modified polyamides, such as polyester-amides, can also be used.

Similarly other thiols can be employed. Examples of these compounds are simple mercaptans, such as methyl and butyl mercaptan and more complex thiols, such as alicyclic, aromatic and heterocyclic thiols. Polythiols can also be used. As indicated in Example I the thiols may contain substituents. Other thiols of this type which can be used are mercaptoacetic acid and diethylaminoethanethiol. The quantity of thiol employed will depend upon the degree of conversion of N-alkoxymethyl amide or N-methylolamide groups into N-alkylthiomethyl or substituted N-alkylthiomethyl amide groups desired. A small excess of thiol is generally employed when a high degree of conversion is desired.

The preferred catalysts are mineral acids, such as hydrochloric and sulfuric. Aromatic sulfonic acids may also be used. The amount of acid used can be varied over a wide range but in general from 1 to 5% based on the weight of N-alkoxymethyl or N-methylol polyamide is employed.

The reaction by which the products of this invention are obtained occurs at ordinary temperatures but is accelerated by heating. Although temperatures as high as 150° C. can be used, there is in general no purpose in going above 75° C. The reaction can be carried out under atmospheric, subatmospheric, or superatmospheric pressures.

The reaction is carried out to greatest advantage in solution. Suitable solvents for the reactants are alcohols, chloroform, alcohol-chloroform mixtures, and mixtures of alcohols or chloroform with aromatic hydrocarbons, e. g. benzene. However, reaction can be effected by immersing fibers, films and the like composed of N-methylol or N-alkoxymethyl polyamides in the thiol or a solution of the thiol containing acid catalyst.

The herein described method for preparing polyamides containing amide groups having a sulfur-bearing substituent has several advantages over the preparation of N-alkylthiomethyl amides directly from polyamides, formaldehyde and a mercaptan. One advantage is that the reaction is substantially quantitative so that there is little loss of thiol. Another advantage is that thiols containing other functional groups can be used without obtaining a complex mixture of products.

As indicated in Example II, polyamides containing both N-alkoxymethyl and N-alkylthiomethyl amide groups can be prepared by the process of this invention. Similarly by reacting N-methylol polyamides with a thiol for a short time, or with a deficiency of thiol, polyamides containing both N-methylol and N-alkylthiomethyl amide groups are obtained.

The products of this invention are more soluble than simple polyamides, such as polyhexamethylene adipamide. In general they have solubilities similar to the N-alkoxymethyl polyamides from which they are derived but the solubility will vary somewhat depending upon the nature of the —SR' group introduced in place of the —OR group. Thus when R' contains hydroxyl groups the product will be more water sensitive than the N-alkoxymethyl polyamide from which it is prepared and may even be water soluble. Most of the products are soluble in alcohols, alcohol-water mixtures, chloroform and mixtures of aromatic hydrocarbons with alcohols or halogenated hydrocarbons. On heating in the presence of acids, e. g. maleic or aromatic sulfonic acids, the products are converted into insoluble infusible products. This change to the infusible state is accomplished most readily when the products contain N-methylol amide or N-alkoxy methyl amide groups in addition to the sulfur-containing substituted amide groups of formula

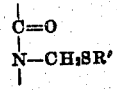

A further property of the products of this invention is their susceptibility to oxidation. On oxidation with hydrogen peroxide, for example, the sulfide group in the sulfur-containing substituted amide groups is converted into a sulfoxide or sulfone group. In other words, oxidation gives rise to a new class of polymeric amides which contain substituted amide groups of formula

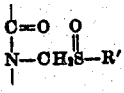

and/or

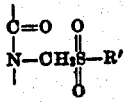

These oxidized products are more sensitive to water than the corresponding alkylthiomethyl compounds and may even be soluble in water.

The sulfur-containing polyamides of this invention can be used in the preparation of fibers, films, coatings, adhesives and, in general, other products of the type which have been made from the simple polyamides. In these various uses the products can be used alone or in admixture with modifying agents, e. g. pigments, dyes, plasticizers, resins, fillers, and the like. The water sensitive derivatives, such as that obtained from thiosorbitol, may be used as a gelatin substitute in the preparation of photographic emulsions since films of such polymers are readily permeable to photographic processing solutions.

As many apparently widely different embodiments of this invention may be made without departing from the spirit and scope thereof, it is to be understood that I do not limit myself to the specific embodiments thereof except as defined in the appended claims.

I claim:

1. A process for obtaining sulfur-containing polyamides which comprises reacting a polymer selected from the group consisting of N-methylol polycarbonamides and N-alkoxymethyl polycarbonamides with a thiol in the presence of an acid catalyst, the average number of carbon atoms in the segments of the chain separating the amide groups in said polycarbonamides being at least two, and the nitrogen in said amide groups being an integral part of the polymer chain.

2. A polymer containing N-alkylthiomethyl carbonamide groups and groups of the class consisting of N-methylol carbonamide and N-alkoxymethyl carbonamide groups, the average number of carbon atoms in the segments of the chain separating said amide groups being at least two, and the nitrogen in said amide groups being an integral part of the polymer chain.

3. A process for obtaining a sulfur-containing polyamide which comprises reacting N-methoxymethyl polyhexamethylene adipamide with octadecyl mercaptan in the presence of an acid catalyst.

4. A process for obtaining a sulfur-containing polyamide which comprises reacting in the presence of an acid catalyst ethyl mercaptan with polyhexamethylene adipamide containing N-methylol groups and N-methoxymethyl groups.

5. An N-octadecylthiomethyl polyhexamethylene adipamide containing N-methoxymethyl amide groups.

6. An N-ethylthiomethyl polyhexamethylene adipamide containing N-methylol amide groups.

ALLAN K. SCHNEIDER.

REFERENCES CITED

The following references are of record in the file of this patent:

UNITED STATES PATENTS

| Number | Name | Date |
| --- | --- | --- |
| 2,213,921 | Sorenson | Sept. 3, 1940 |